United States Patent
Kuroda et al.

(10) Patent No.: US 6,798,452 B1
(45) Date of Patent: Sep. 28, 2004

(54) AMPLIFYING SOLID-STATE IMAGING DEVICE, METHOD FOR DRIVING THE SAME AND PHYSICAL QUANTITY DISTRIBUTION SENSING SEMICONDUCTOR DEVICE

(75) Inventors: Takao Kuroda, Osaka (JP); Masayuki Masuyama, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/122,589

(22) Filed: Jul. 27, 1998

(30) Foreign Application Priority Data

Jul. 28, 1997 (JP) ............................................. 9-201221

(51) Int. Cl.[7] .......................... H04N 3/14; H04N 5/217; H04N 9/64; H04N 1/40
(52) U.S. Cl. ....................... 348/301; 348/308; 348/241; 348/243; 348/302; 358/463; 358/461; 250/214 A
(58) Field of Search ................................. 348/301, 308, 348/241, 243, 302; 358/463, 461; 250/214 A (56) References Cited

U.S. PATENT DOCUMENTS

| | | | |
|---|---|---|---|
| 5,047,861 A | * | 9/1991 | Houchin et al. ............ 348/247 |
| 5,283,633 A | * | 2/1994 | Tabei ......................... 348/282 |
| 5,631,704 A | | 5/1997 | Dickinson et al. |

FOREIGN PATENT DOCUMENTS

| | | |
|---|---|---|
| JP | 54-65419 | 5/1979 |
| JP | 58-177023 | 10/1983 |
| JP | 62-193462 | 8/1987 |
| JP | 63-106529 | 5/1988 |
| JP | 63-238773 | 10/1988 |
| JP | 3-235587 | 10/1991 |
| JP | 6-224762 | 8/1994 |
| JP | 8-181920 | 7/1996 |

* cited by examiner

*Primary Examiner*—Tuan Ho
*Assistant Examiner*—James Hannett
(74) *Attorney, Agent, or Firm*—McDermott Will & Emery LLP (57) ABSTRACT

The output voltage of a pixel is held as a reference signal output voltage in a reference signal holding capacitor connected to a positive input terminal of a second subtractor by lowering the potential of a reset voltage to that of a calibration voltage and by activating a reset pulse and a reference-signal-calibrating pulse. Then, the reference signal output voltage is output from the second subtractor. And a corrected reference signal output voltage, obtained by subtracting the reference signal output voltage from a no signal output voltage, is held in a corrected reference signal holding capacitor. Moreover, a divider divides a corrected original signal output voltage, which is held in a corrected original signal holding capacitor, by the corrected reference signal output voltage, which is held in the corrected reference signal holding capacitor.

16 Claims, 5 Drawing Sheets

OFFSET COMPONENT ELIMINATION   SENSITIVITY COMPONENT ELIMINATION
(CALIBRATION)

AMPLIFYING SOLID-STATE IMAGING DEVICE, METHOD FOR DRIVING THE SAME AND PHYSICAL QUANTITY DISTRIBUTION SENSING SEMICONDUCTOR DEVICE

BACKGROUND OF THE INVENTION

The present invention generally relates to a physical quantity distribution sensing semiconductor device for reading, as electric signals, the distribution of a physical quantity that has been externally input and transduced into the electric signals. More particularly, the present invention relates to an amplifying solid-state imaging device for reading externally incident light as electric signals while eliminating variations resulting from the sensitivity components of the signals, and also relates to a method for driving the same.

In recent years, semiconductor devices for sensing a physical quantity distribution have been increasingly demanded. In particular, an amplifying solid-state imaging device, that is, a solid-state image sensor that can sense light among various types of physical quantities, attracts a great deal of attention, because such a device can operate with lower electric power and can easily integrate a variety of circuits on a chip.

Hereinafter, a conventional amplifying solid-state imaging device will be described with reference to the drawings.

Figure 5:
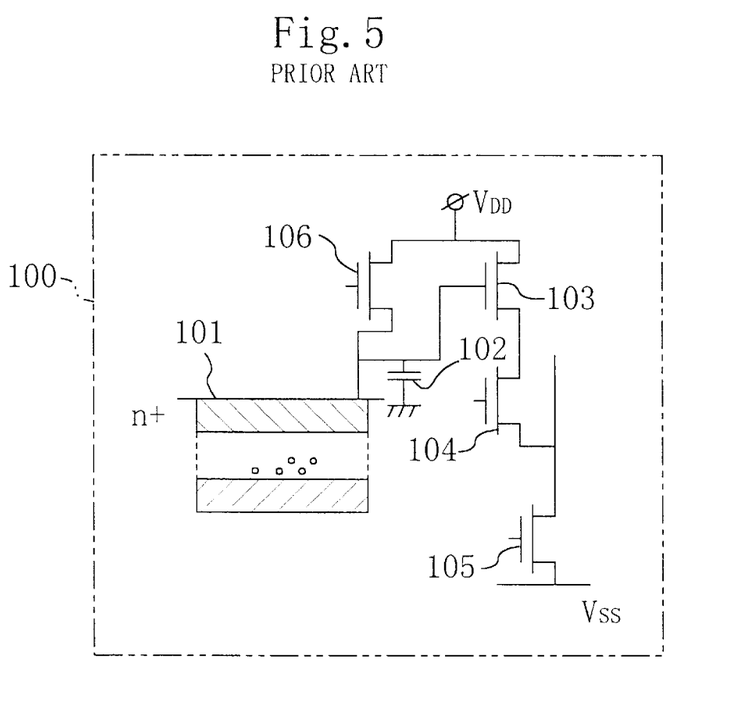
FIG. 5 is a schematic diagram illustrating an equivalent circuit corresponding to one pixel of a conventional amplifying solid-state imaging device.

FIG. 5 schematically illustrates an equivalent circuit corresponding to one pixel of a conventional amplifying solid-state imaging device. In FIG. 5, the reference numeral 100 denotes one of a plurality of pixels arranged in matrix. The pixel 100 includes: a photoelectric transducer 101, implemented as a photodiode to which an inverse bias voltage is applied, for transducing light into signal charges; a signal charge accumulator 102, implemented as a capacitor, for accumulating the signal charges transduced by the photoelectric transducer 101; a driving transistor 103 including an operation control section having the gate of a field effect transistor (hereinafter, abbreviated as "FET") for controlling the drive current in accordance with the amount of the signal charges accumulated in the signal charge accumulator 102; a row select transistor 104 for selecting a pixel 100 on a specific row from a plurality of pixels 100; a column select transistor 105 for selecting a pixel 100 on a specific column from a plurality of pixels 100; and a resetting transistor 106 for reading the potential in the signal charge accumulator 102 at a predetermined time and then resetting the potential at an initial potential $V_{DD}$. Herein, the capacitor constituting the signal charge accumulating section 102 is, in actuality, capacitance formed by the photoelectric transducer 101 and the gate of the driving transistor 103.

However, in the conventional amplifying solid-state imaging device, the driving transistor 103 is provided for each pixel 100 and the electrical characteristics of the respective driving transistors 103 are different from each other. Thus, an image of uniform quality is hard to obtain when the image is produced by using amplified signal current.

The noise components that has resulted from such a variation in electrical characteristics of the transistors and fixed in an image space, i.e., fixed pattern noise (FPN), can be roughly classified into the following two types.

The first type is noise components called "offset components" resulting from the variation in threshold voltages $V_t$ of the FETs, for example. In such a case, even when light is uniformly incident onto an input section, unevenness is caused in the resulting image, because variation is found in the current values of the output signals.

The second type is noise components called "dynamic sensitivity components" resulting from the variation in capacitance of the signal charge accumulator 102 or in gains obtained by using the driving transistor 103 as a source follower.

Figure 6:
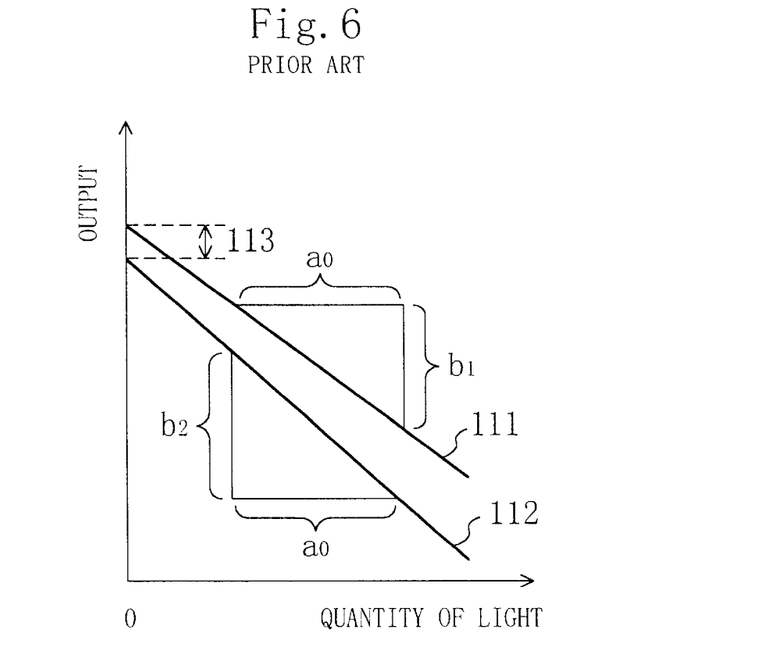
FIG. 6 is a graph representing the FPN by the relationship between the quantity of light and the output in the conventional amplifying solid-state imaging device.

FIG. 6 illustrates these two types of FPNs. In FIG. 6, the axis of abscissas indicates the quantity of light incident onto a pixel, while the axis of ordinates indicates the output values of each pixel. Line 111 represents the output characteristics of a pixel, while Line 112 represents the characteristics of another pixel. As shown in FIG. 6, a potential difference corresponding to the difference 113 between the Y intercepts is the offset component of the FPN. The offset component is generated because a drive voltage applied to the gate of the driving transistor 103 is obtained from the difference between a power supply voltage $V_{DD}$ and the threshold voltage $V_t$ and because the threshold voltages $V_t$ of the respective driving transistors are different from each other. On the other hand, the sensitivity component of the FPN is a ratio associated with each characteristic line. Specifically, in Line 111, the component is equal to: output/quantity of light=$b_1/a_0$, while in Line 112, the component is equal to: output/quantity of light=$b_2/a_0$. In this case, as can be easily understood from FIG. 6, the absolute value of the ratio $b_2/a_0$ of Line 112 is larger than that of the ratio $b_1/a_0$ of Line 111.

A solution for eliminating the offset component 113 is already disclosed in Japanese Laid-Open Publication No. 8181920.

However, no solution has ever been provided for the elimination of the FPN sensitivity component. As higher and higher image quality is sought after in the future, the adverse effects of the component on the image quality would presumably become more and more serious.

SUMMARY OF THE INVENTION

In view of the above-described conventional problems, the object of the present invention is to eliminate, from the FPN, the sensitivity components resulting from the variation in capacitance and the like of the charge accumulator.

In order to accomplish the object, according to the present invention, an output signal of each pixel is obtained by dividing a signal, which is output from a driving transistor in response to light incident upon a photoelectric transducer, by a reference output voltage, which is output from the driving transistor upon the application of a predetermined reference electric signal thereto.

A first amplifying solid-state imaging device according to the present invention includes: a plurality of photoelectric transducing means, each sensing externally incident light and transducing the sensed incident light into signal charges having a charge quantity corresponding to the incident light; a plurality of signal charge accumulating means, each accumulating the signal charges transduced by an associated one of the photoelectric transducing means; and signal reading means for sequentially reading out the signal charges, accumulated in the respective signal charge accumulating means, as electric signals. Each said electric signal is obtained by dividing an original electric signal by a reference electric signal and read out. The original electric signal is obtained by converting the signal charges accumulated in each said signal charge accumulating means. The reference electric signal is obtained by converting reference signal charges, which are output from each said signal charge accumulating means in response to predetermined reference light incident upon each said photoelectric transducing means, or by converting reference signal charges, which are output from each said signal charge accumulating means in response to a predetermined reference electric signal externally applied to each said signal charge accumulating means.

In the first amplifying solid-state imaging device, in the period of reading the electric signal, the original electric signal obtained by converting the signal charges accumulated in each said signal charge accumulating means that has received externally incident light is divided by the reference electric signal obtained by converting reference signal charges, which are output from each said signal charge accumulating means in response to predetermined reference light incident upon each said photoelectric transducing means, or by converting reference signal charges, which are output from each said signal charge accumulating means in response to a predetermined reference electric signal externally applied to each said signal charge accumulating means. And each division result is output as an electric signal. Thus, even if electrical characteristics of a plurality of photoelectric transducing means and a plurality of signal charge accumulating means are dynamically varied because of the incidence of light onto the respective photoelectric transducing means and respective signal charge accumulating means, it can be assumed that predetermined incident light has been uniformly input to every photoelectric transducing means and every signal charge accumulating means. As a result, the sensitivity components, resulting from the variation in sensitivities of the respective original electric signals that are output from the respective signal charge accumulating means, can be eliminated from the FPN.

The reasons why the predetermined incident light can be assumed to have been uniformly input to any of these means will be described later.

A second amplifying solid-state imaging device according to the present invention includes: an imaging area in which a plurality of unit pixels are arranged, each said unit pixel including photoelectric transducing means for sensing externally incident light and transducing the sensed incident light into signal charges having a charge quantity corresponding to the incident light, and signal charge accumulating means for accumulating the signal charges transduced by the photoelectric transducing means; a signal reading section for sequentially selecting a unit pixel from the unit pixels one by one and reading out the signal charges accumulated in the selected unit pixel as an electric signal; and a plurality of calibration sections formed between outputs of the imaging area and inputs of the signal reading section so as to correspond to the respective unit pixels in the imaging area. Each said calibration section includes: original signal storing means for storing an original electric signal obtained by converting the signal charges accumulated in one of the unit pixels associated with the calibration section; reference signal storing means for storing a reference electric signal that is output from the associated unit pixel upon the application of a predetermined reference electric signal to the associated unit pixel; and division means for dividing the original electric signal stored in the original signal storing means by the reference electric signal stored in the reference signal storing means and outputting the division result as an electric signal to the signal reading section.

In the second amplifying solid-state imaging device, each said calibration section includes: original signal storing means for storing an original electric signal obtained by converting the signal charges accumulated in one of the unit pixels associated with the calibration section; reference signal storing means for storing a reference electric signal that is output from the associated unit pixel upon the application of a predetermined reference electric signal to the associated unit pixel; and division means for dividing the original electric signal stored in the original signal storing means by the reference electric signal stored in the reference signal storing means and outputting the division result as an electric signal to the signal reading section. Thus, even if electrical characteristics of a plurality of unit pixels in the imaging area are dynamically varied because of the incidence of light onto the respective unit pixels, it can be assumed that predetermined incident light has been uniformly input to every unit pixel. As a result, the sensitivity components, resulting from the variation in sensitivities of the respective original electric signals that are output from the respective unit pixels, can be eliminated from the FPN, and the sensed incident light can be reproduced and output with high definition.

In the second amplifying solid-state imaging device, the original signal storing means preferably includes: an original signal holding capacitor; and an original signal switch transistor having a drain connected to the outputs of the imaging area, a source connected to one electrode of the original signal holding capacitor and a gate receiving an original-signal-calibrating signal. The reference signal storing means preferably includes: a reference signal holding capacitor; and a reference signal switch transistor having a drain connected to the outputs of the imaging area, a source connected to one electrode of the reference signal holding capacitor and a gate receiving a reference-signal-calibrating signal. The division means preferably includes a divider having a dividend input terminal connected to a common connection between the original signal switch transistor and the original signal holding capacitor, a divisor input terminal connected to a common connection between the reference signal switch transistor and the reference signal holding capacitor and an output terminal connected to the inputs of the signal reading section.

In such an embodiment, a calibration section for eliminating the FPN sensitivity components can be obtained with certainty.

In the second amplifying solid-state imaging device, each said calibration section preferably includes: an original signal offset component eliminator connected to the original signal storing means; and a reference signal offset component eliminator connected to the reference signal storing means. The original signal offset component eliminator preferably includes: a first no signal output holding capacitor; a no signal output switch transistor having a drain connected to the outputs of the imaging area, a source connected to one electrode of the first no signal output holding capacitor, and a gate receiving a no signal output calibrating signal; a first subtractor having a positive input terminal connected to a common connection between the original signal switch transistor and the original signal holding capacitor, and a negative input terminal connected to a common connection between the no signal output switch transistor and the first no signal output holding capacitor; and a corrected original signal holding capacitor connected in parallel between the first subtractor and the dividend input terminal of the divider. The reference signal offset component eliminator preferably includes: the no signal output switch transistor; a second no signal output holding capacitor having one electrode connected to the source of the no signal output switch transistor; a second subtractor having a positive input terminal connected to a common connection between the reference signal switch transistor and the reference signal holding capacitor, and a negative input terminal connected to a common connection between the no signal output switch transistor and the second no signal output holding capacitor; and a corrected reference signal holding capacitor connected in parallel between the second subtractor and the divisor input terminal of the divider.

In such an embodiment, since an original signal offset component eliminator connected to the original signal storing means and a reference signal offset component eliminator connected to the reference signal storing means are further provided, the FPN offset components can also be eliminated.

The method for driving an amplifying solid-state imaging device according to the present invention is a method for driving an amplifying solid-state imaging device including: an imaging area in which a plurality of unit pixels are arranged, each said unit pixel including photoelectric transducing means for sensing externally incident light and transducing the sensed incident light into signal charges having a charge quantity corresponding to the incident light, and signal charge accumulating means for accumulating the signal charges transduced by the photoelectric transducing means; a signal reading section for sequentially selecting a unit pixel from the unit pixels one by one and reading out the signal charges accumulated in the selected unit pixel as an electric signal; and a plurality of calibration sections formed between outputs of the imaging area and inputs of the signal reading section so as to correspond to the respective unit pixels in the imaging area. The method includes the steps of: making the signal reading section sequentially read out the signal charges, accumulated in the signal charge accumulating means of each said unit pixel, as an original electric signal; making one of the calibration sections, associated with the unit pixel, store the read-out original electric signal; making the signal reading section reset the read-out signal charges which have been accumulated in the signal charge accumulating means; applying a predetermined reference electric signal to the signal charge accumulating means accessed and making the calibration section store the reference electric signal that is output from the signal charge accumulating means to which the predetermined electric signal has been applied; and dividing the stored original electric signal by the stored reference electric signal and outputting the division result to the signal reading section as the electric signal.

In the method for driving an amplifying solid-state imaging device in accordance with the present invention, the signal charges accumulated in the signal charge accumulating means of each said unit pixel are sequentially read out as an original electric signal, and the read-out original electric signal is stored in each said calibration section. Then, the read-out signal charges accumulated in the signal charge accumulating means are reset, a predetermined reference electric signal is applied to the signal charge accumulating means accessed and the reference electric signal that is output from the signal charge accumulating means, to which the predetermined electric signal has been applied, is stored in the calibration section. Thereafter, the stored original electric signal is divided by the stored reference electric signal and the division result is output to the signal reading section as the electric signal. Thus, even if electrical characteristics of a plurality of unit pixels in the imaging area are dynamically varied because of the incidence of light onto the respective unit pixels, it can be assumed that predetermined incident light has been uniformly input to every unit pixel. As a result, the sensitivity components, resulting from the variation in sensitivities of the respective original electric signals that are output from the respective unit pixels, can be eliminated from the FPN.

A first physical quantity distribution sensing semiconductor device according to the present invention includes: a plurality of physical quantity sensing and transducing means, each sensing externally input physical quantity and transducing the sensed physical quantity into signal charges having a charge quantity corresponding to the physical quantity; a plurality of signal charge accumulating means, each accumulating the signal charges transduced by an associated one of the physical quantity sensing and transducing means; and signal reading means for sequentially reading out the signal charges accumulated in the respective signal charge accumulating means as electric signals. The electric signals are obtained by dividing an original electric signal by a reference electric signal and read out. The original electric signal is obtained by converting the signal charges accumulated in each said signal charge accumulating means. The reference electric signal is obtained by converting reference signal charges, which are output from each said signal charge accumulating means in response to predetermined reference physical quantity input to each said physical quantity sensing and transducing means, or by converting reference signal charges, which are output from each said signal charge accumulating means in response to a predetermined reference electric signal externally applied to each said signal charge accumulating means.

In the first physical quantity distribution sensing semiconductor device, in the period of reading the electric signal, the original electric signal, which is obtained by converting the signal charges accumulated in each said signal charge accumulating means that has externally received some physical quantity, is divided by the reference electric signal, which is obtained by converting reference signal charges that are output from each said signal charge accumulating means in response to predetermined reference physical quantity input to each said physical quantity sensing and transducing means or by converting reference signal charges that are output from each said signal charge accumulating means in response to a predetermined reference electric signal externally applied to each said signal charge accumulating means. And each division result is output as an electric signal. Thus, even if electrical characteristics of a plurality of physical quantity sensing and transducing means and a plurality of signal charge accumulating means are dynamically varied because of the reception of physical quantities by the respective physical quantity sensing and transducing means and respective signal charge accumulating means, it can be assumed that predetermined physical quantity has been uniformly input to every physical quantity sensing and transducing means and every signal charge accumulating means. As a result, the sensitivity components, resulting from the variation in sensitivities of the respective original electric signals that are output from the respective signal charge accumulating means, can be eliminated from the FPN.

A second physical quantity distribution sensing semiconductor device according to the present invention includes: a physical quantity distribution sensing area in which a plurality of unit sensing sections are arranged, each said unit sensing section including physical quantity sensing and transducing means for sensing externally input physical quantity and transducing the sensed physical quantity into signal charges having a charge quantity corresponding to the physical quantity, and signal charge accumulating means for accumulating the signal charges transduced by the physical quantity sensing and transducing means; a signal reading section for sequentially selecting a unit sensing section from the unit sensing sections one by one and reading out the signal charges accumulated in the selected unit sensing section as an electric signal; and a plurality of calibration sections formed between outputs of the physical quantity distribution sensing area and inputs of the signal reading section so as to correspond to the respective unit sensing sections in the physical quantity distribution sensing area. Each said calibration section includes: original signal storing means for storing an original electric signal obtained by converting the signal charges accumulated in one of the unit sensing sections associated with the calibration section; reference signal storing means for storing a reference electric signal, which is output from the associated unit sensing section upon the application of a predetermined reference electric signal to the associated unit sensing section; and division means for dividing the original electric signal stored in the original signal storing means by the reference electric signal stored in the reference signal storing means and outputting the division result as an electric signal to the signal reading section.

In the second physical quantity distribution sensing semiconductor device, each said calibration section includes: original signal storing means for storing an original electric signal obtained by converting the signal charges accumulated in one of the unit sensing sections associated with the calibration section; reference signal storing means for storing a reference electric signal, which is output from the associated unit sensing section upon the application of a predetermined reference electric signal to the associated unit sensing section; and division means for dividing the original electric signal stored in the original signal storing means by the reference electric signal stored in the reference signal storing means and outputting the division result as an electric signal to the signal reading section. Thus, even if electrical characteristics of a plurality of unit sensing sections in the physical quantity distribution sensing area are dynamically varied because of the reception of physical quantities by the respective unit sensing sections, it can be assumed that predetermined physical quantity has been uniformly input to every unit sensing section. As a result, the sensitivity components, resulting from the variation in sensitivities of the respective original electric signals that are output from the respective unit sensing sections, can be eliminated from the FPN, and the sensed physical quantity can be reproduced and output with high definition.

In the second physical quantity distribution sensing semiconductor device, the original signal storing means preferably includes: an original signal holding capacitor; and an original signal switch transistor having a drain connected to the outputs of the physical quantity distribution sensing area, a source connected to one electrode of the original signal holding capacitor and a gate receiving an original-signal-calibrating signal. The reference signal storing means preferably includes: a reference signal holding capacitor; and a reference signal switch transistor having a drain connected to the outputs of the physical quantity distribution sensing area, a source connected to one electrode of the reference signal holding capacitor and a gate receiving a reference-signal-calibrating signal. The division means preferably includes a divider having a dividend input terminal connected to a common connection between the original signal switch transistor and the original signal holding capacitor, a divisor input terminal connected to a common connection between the reference signal switch transistor and the reference signal holding capacitor, and an output terminal connected to the inputs of the signal reading section.

DETAILED DESCRIPTION OF THE INVENTION

Hereinafter, an embodiment of the present invention will be described with reference to the drawings.

Figure 1:
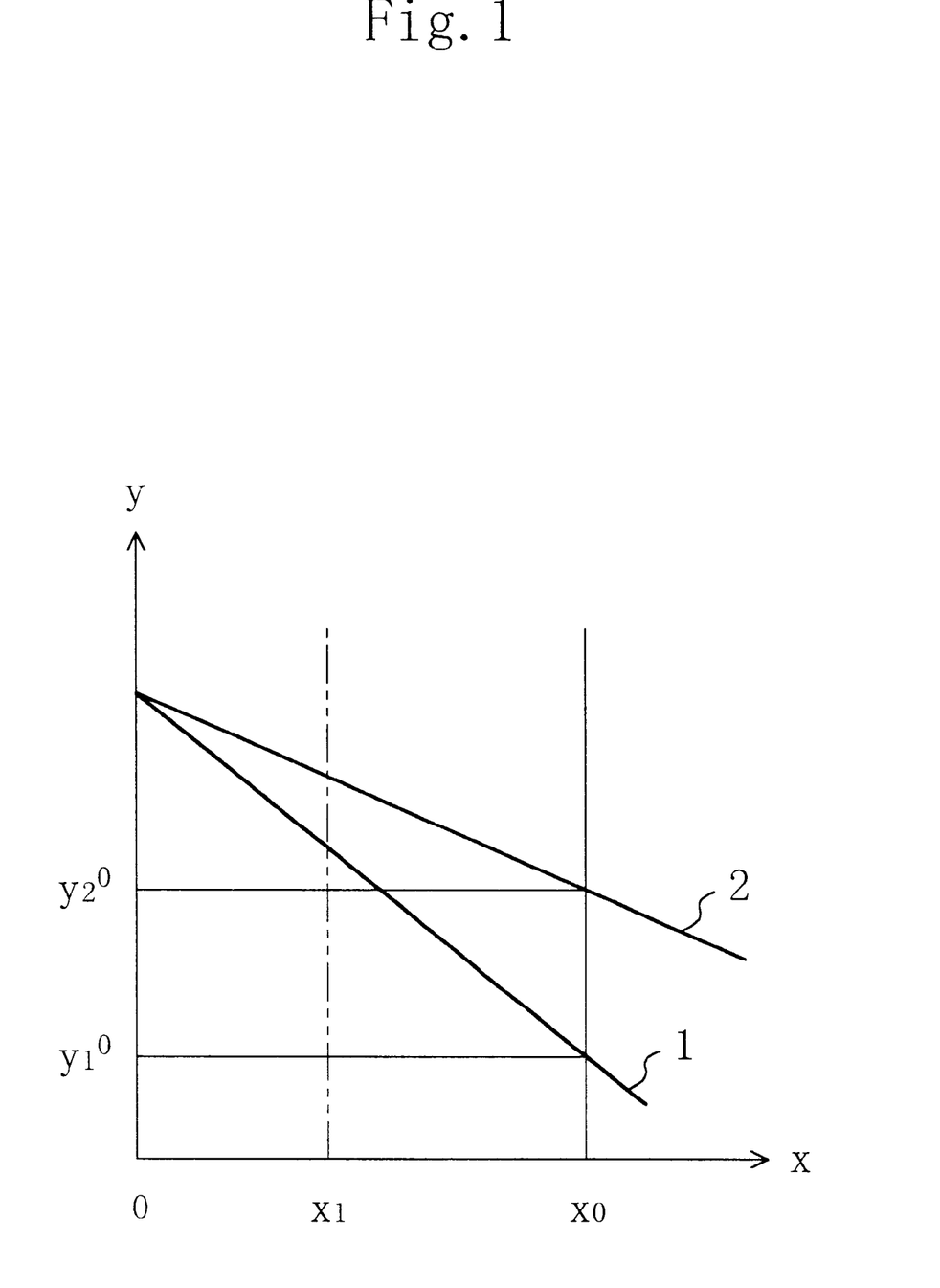
FIG. 1 is a conceptual diagram illustrating a method for driving a physical quantity distribution sensing semiconductor device in an embodiment of the present invention.

FIG. 1 illustrates the concept of a method for driving an amplifying solid-state imaging device implemented as a physical quantity distribution sensing semiconductor device in an embodiment of the present invention, i.e., an adjustment method for eliminating the FPN sensitivity components. In FIG. 1, the axis of abscissas indicates the quantity of light incident onto a pixel and the axis of ordinates indicates the output value of the pixel. Line 1 represents the output characteristic of a pixel and Line 2 represents the output characteristic of another pixel having different sensitivity than that of the former pixel. Herein, the FPN offset components are assumed to have already been eliminated for the sake of simplicity of illustration. The respective Lines 1 and 2 can be represented by the following Equations.

$$y_1 = a_1 \times x \tag{1}$$

$$y_2 = a_2 \times x \tag{2}$$

where the factors of proportionality $a_1$ and $a_2$ are constants that are not equal to zero and are different from each other.

As shown in FIG. 1, if reference light having a predetermined quantity of light $x_0$ used as a reference for adjustment has been uniformly incident onto the respective pixels, then the reference output values for the respective pixels represented by Lines 1 and 2 are:

$$y_1^0 = a_1 \times x_0 \tag{3}$$

$$y_2^0 = a_2 \times x_0 \tag{4}$$

By using Equations (1) and (3), an arbitrary quantity of light $x_1$ for Line 1 can be given by $$x_1 = (y_1/y_1^0) \times x_0 \tag{5}$$

Similarly, by using Equations (2) and (4), an arbitrary quantity of light $x_1$ for Line 2 can be given by $$x_1 = (y_2/y_2^0) \times x_0 \tag{6}$$

As can be understood from Equations (5) and (6), if the output values of respective pixels are divided by the reference output values of the respective pixels when reference light is incident onto the respective pixels, then it can be assumed that incident light having a constant quantity of light $x_1$ has been uniformly incident onto the respective pixels even if the sensitivities of the pixels are different from each other. Thus, the FPN sensitivity components have been substantially eliminated.

Hereinafter, the amplifying solid-state imaging device in an embodiment of the present invention will be described with reference to the drawings.

Figure 2:
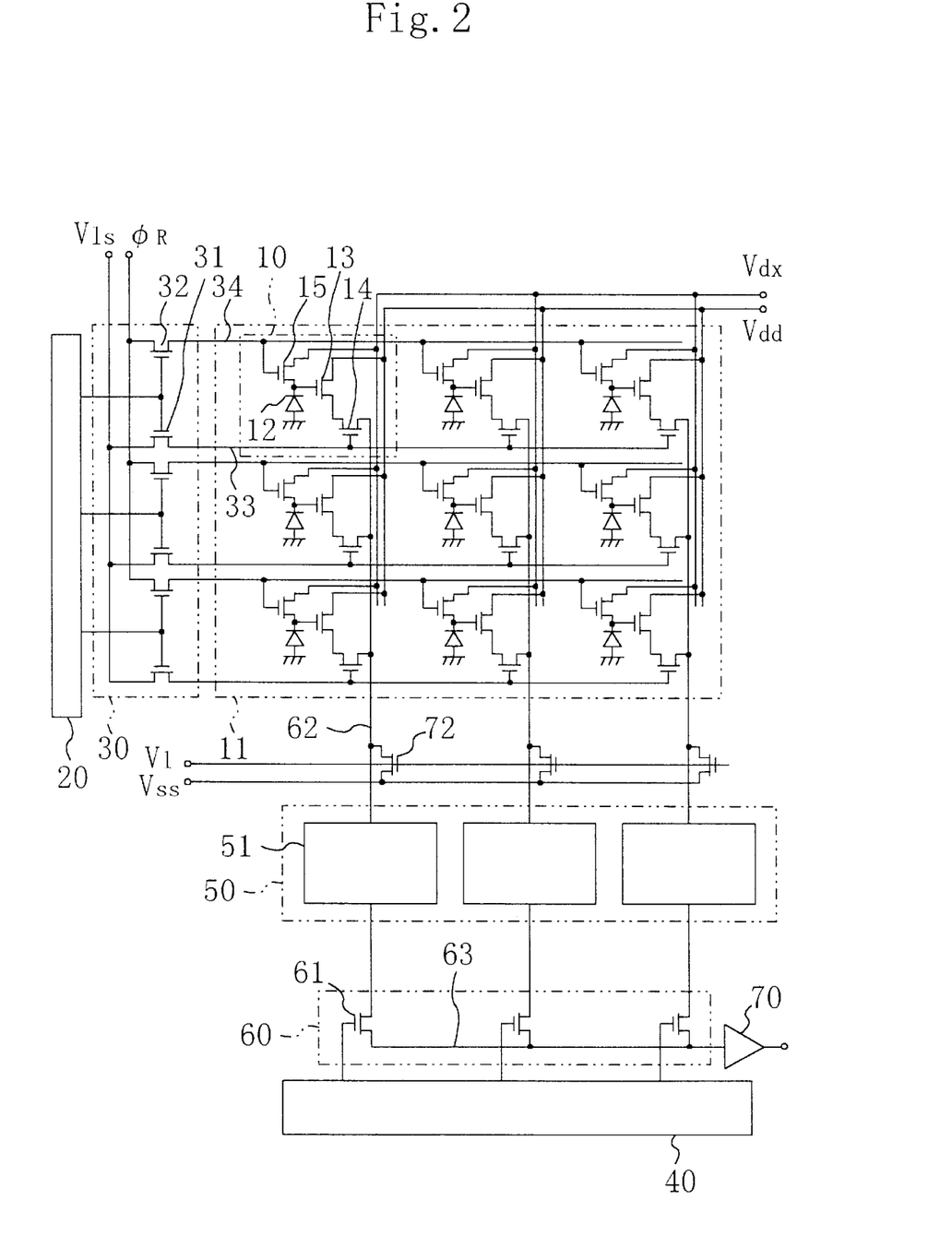
FIG. 2 is a block diagram illustrating the configuration of the physical quantity distribution sensing semiconductor device in the embodiment of the present invention.

FIG. 2 illustrates a block configuration of the amplifying solid-state imaging device in the embodiment of the present invention.

As shown in FIG. 2, the amplifying solid-state imaging device includes: an imaging area 11, which is implemented as a physical quantity distribution sensing area and in which n rows×m columns of pixels 10, functioning as unit sensing sections, are arranged (where n and m are integers); a row select shift register 20, implemented as part of a signal reading section, for allowing sequential and unidirectional access to the pixels 10 arranged in the row direction (i.e., the direction in which the row number increases/decreases) in the imaging area 11; a selected row driving section 30, implemented as another part of the signal reading section, which is connected to row select lines 33 and pixel reset voltage supply lines 34 between the imaging area 11 and the row select shift register 20 and allows reading of the potential accumulated in the pixels 10 on the selected row; a column select shift register 40, implemented as another part of the signal reading section, for allowing sequential and unidirectional access to the pixels 10 arranged in the column direction (i.e., the direction in which the column number increases/decreases) in the imaging area 11; a calibration section 50, connected to vertical signal lines 62 between the imaging area 11 and the column select shift register 40, for adjusting the FPN sensitivity components of the output signals of the respective pixels 10; and a selected column driving section 60, implemented as another part of the signal reading section, which is connected between the column select shift register 40 and the calibration section 50 and allows reading of the potential accumulated in the pixels 10 on the selected column.

Each pixel 10 includes a photoelectric transducer/accumulator 12 implemented as a photodiode. In the photoelectric transducer/accumulator 12, the anode of the photodiode is grounded, and a power supply voltage $V_{dd}$ is applied to the cathode of the photodiode and the potential of the cathode drops in accordance with the quantity of externally incident light during resetting. In this way, the photoelectric transducer/accumulator 12 functions as both physical quantity sensing and transducing means and signal charge accumulating means.

Each pixel 10 further includes: a driving transistor 13 having a gate connected to the photoelectric transducer/accumulator 12 and a drain to which the power supply voltage $V_{dd}$ is applied; a row select transistor 14 having a gate connected to the associated row select line 33, a drain connected to the source of the driving transistor 13 and a source connected to the associated vertical signal line 62; and a pixel reset transistor 15 having a gate connected to the associated pixel reset voltage supply line 34, a drain to which a reset voltage $V_{dx}$ is applied, and a source connected to the cathode of the photoelectric transducer/accumulator 12. The reset voltage $V_{dx}$ becomes equal to the power supply voltage $V_{dd}$ during resetting and becomes equal to a calibration voltage $V_{dc}$ during calibration.

The selected row driving section 30 includes: the same number (=n) of selected row driving transistors 31 and selected row resetting transistors 32 as the number of the rows. The gate of each of the transistors 31 is controlled by the row select shift register 20. A selected row driving voltage $V_{ls}$ is applied to the drain of each transistor 31. The source of each transistor 31 is connected to the associated row select line 33. The gate of each of the transistors 32 is controlled by the row select shift register 20. A reset pulse $\theta_R$ is applied to the drain of each transistor 32. The source of each transistor 32 is connected to the associated pixel reset voltage supply line 34.

The calibration section 50 includes the same number (=m) of calibration circuits 51 as the number of the columns. The input section of each calibration circuit 51 is connected to the associated vertical signal line 62 and the output section thereof is connected to the selected column driving section 60.

The selected column driving section 60 includes the same number (=m) of selected column driving transistors 61 as the number of the columns. The gate of each transistor 61 is controlled by the column select shift register 40. The drain of each transistor 61 is connected to the associated calibration circuit 51 in the calibration section 50. The source of each transistor 61 is connected to a horizontal signal line 63.

Also, load transistors 72 functioning as loads are formed between the imaging area 11 and the calibration section 50. A load transistor control voltage $V_1$ is applied to the gate of each transistor 72. The drain of each transistor 72 is connected to the associated vertical signal line 62. A ground voltage $V_{ss}$ is applied to the source of each transistor 72. A source follower circuit is formed by the driving transistor 13 in each pixel 10 and the associated load transistor 72. The output signal of each source follower circuit is input to an impedance transformer 70 through the horizontal signal line 63 in the selected column driving section 60. The impedance of the output signal is transformed into predetermined impedance and then the signal is output to the outside.

Figure 3:
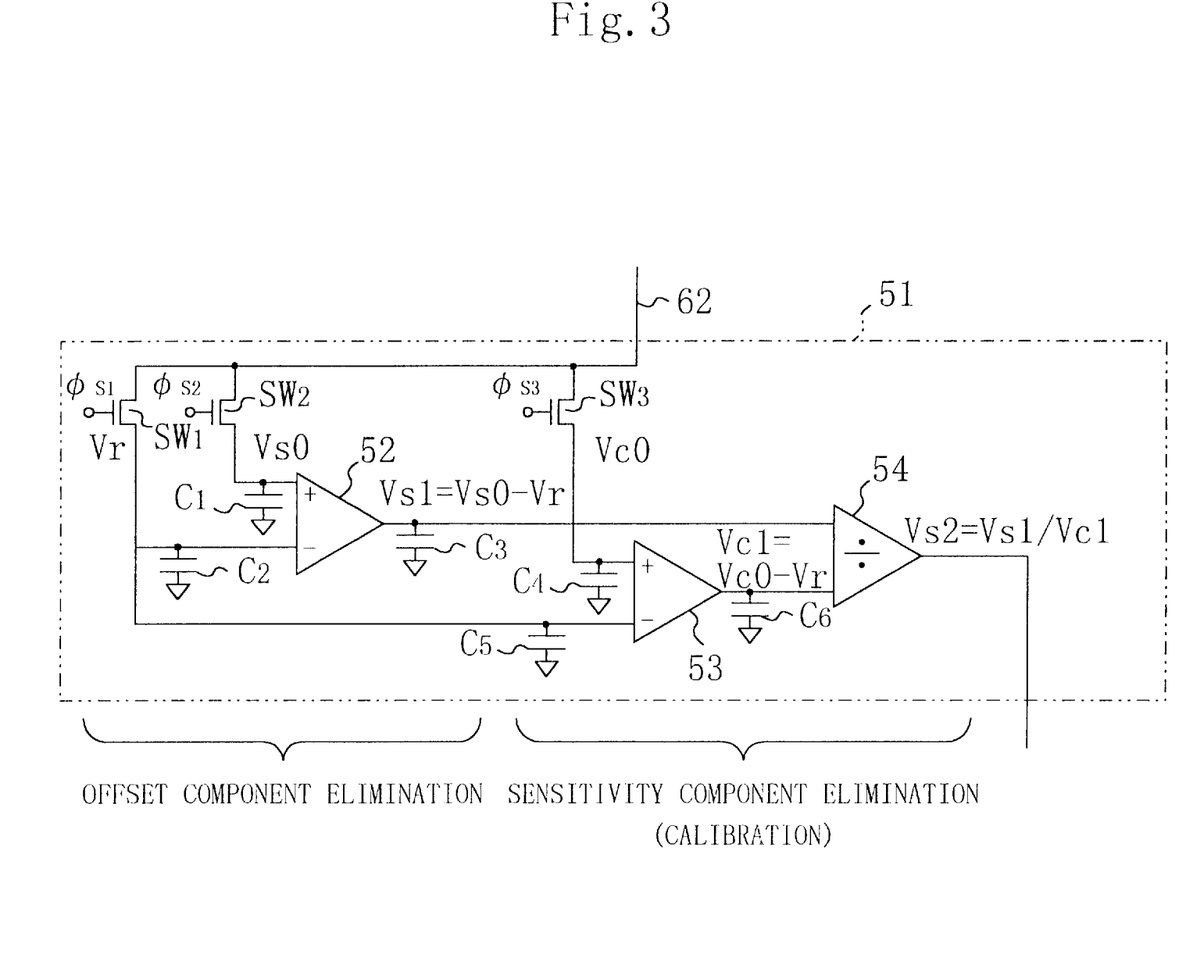
FIG. 3 is a circuit diagram illustrating a calibration circuit in the physical quantity distribution sensing semiconductor device in the embodiment of the present invention.

FIG. 3 illustrates a circuit configuration of the calibration circuit 51 of the calibration section 50 in this embodiment.

As shown in FIG. 3, the output signal of the pixel 10 shown in FIG. 2 is input through the vertical signal line 62 to the common drain of a no signal output voltage switch transistor $SW_1$, an original signal switch transistor $SW_2$ and a reference signal switch transistor $SW_3$. A no signal output voltage calibration pulse $\theta_1$ is applied to the gate of the transistor $SW_1$, and the source of the transistor $SW_1$ is connected to the respective negative input terminals of first and second subtractors 52, 53. An original signal calibration pulse $\theta_{S2}$ is applied to the gate of the transistor $SW_2$, and the source of the transistor $SW_2$ is connected to the positive input terminal of the first subtractor 52. A reference signal calibration pulse $\theta_{S3}$ is applied to the gate of the transistor $SW_3$, and the source of the transistor $SW_3$ is connected to the positive input terminal of the second subtractor 53.

An original signal holding capacitor $C_1$ functioning as original signal storing means is connected in parallel to the positive input terminal of the first subtractor 52. A first no signal output voltage holding capacitor $C_2$ is connected in parallel to the negative input terminal of the first subtractor 52. The output terminal of the first subtractor 52 is connected in parallel to the dividend input terminal of a divider 54 functioning as division means and to a corrected original signal holding capacitor $C_3$. A reference signal holding capacitor $C_4$ functioning as reference signal storing means is connected in parallel to the positive input terminal of the second subtractor 53. A second no signal output voltage holding capacitor $C_5$ is connected in parallel to the negative input terminal of the second subtractor 53. The output terminal of the second subtractor 53 is connected in parallel to the divisor input terminal of the divider 54 and to a corrected reference signal holding capacitor $C_6$. The output signal of the divider 54 is input to the drain of the associated selected column driving transistor 61 in the selected column driving section 60 shown in FIG. 2.

Hereinafter, the operation of the amplifying solid-state imaging device having the above-described configuration will be described while referring to a method for eliminating the FPN offset components and sensitivity components, with reference to the drawings.

Figure 4:
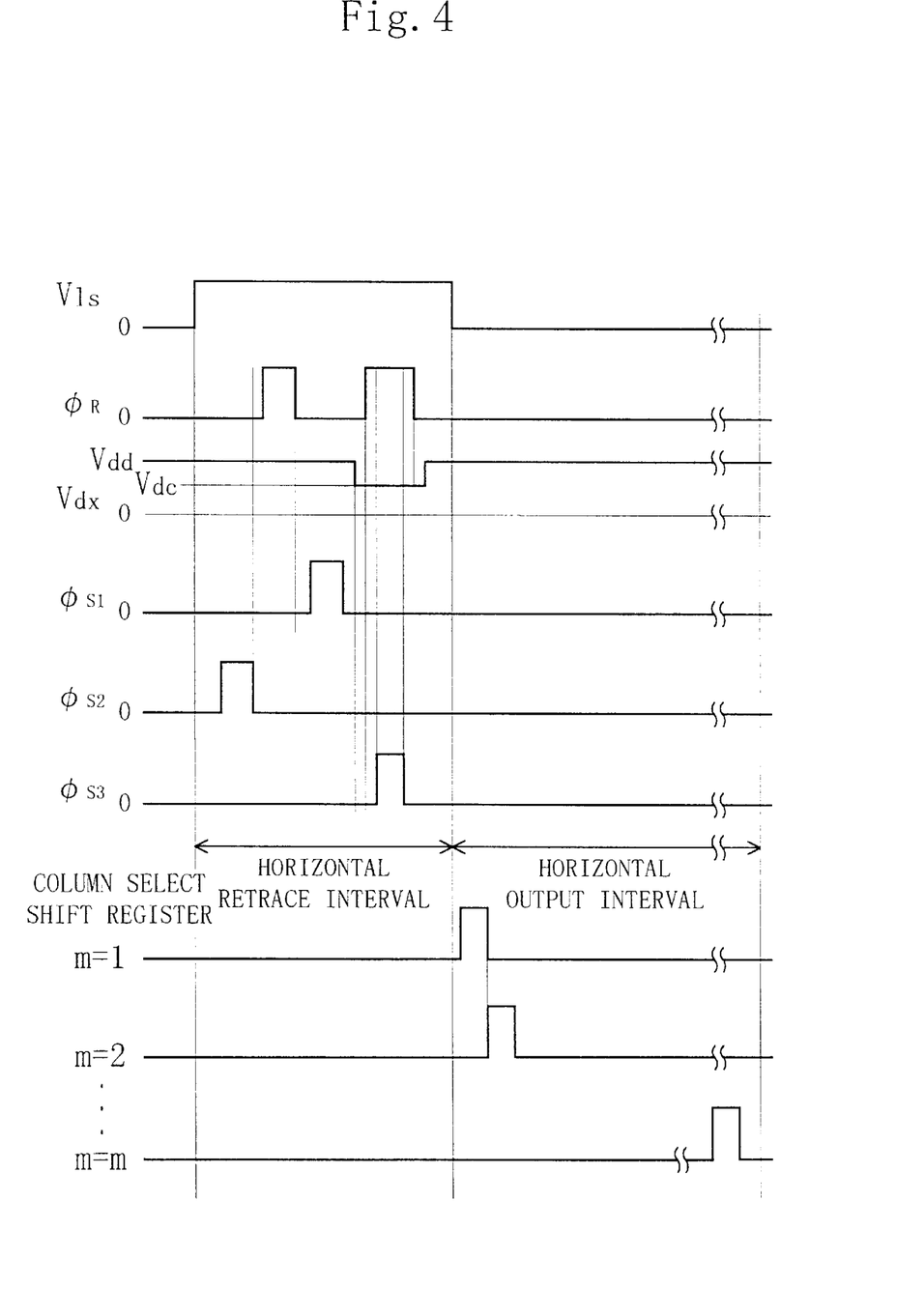
FIG. 4 is a timing diagram defining the operation of the physical quantity distribution sensing semiconductor device in the embodiment of the present invention.

FIG. 4 is a timing diagram illustrating the operation of the amplifying solid-state imaging device in an embodiment of the present invention.

Light is assumed to be externally incident onto the imaging area 11 shown in FIG. 2. As shown in FIG. 4, one cycle is divided into a horizontal retrace interval during which the FPN is eliminated from each pixel 10 and a horizontal output interval during which the output signal with the FPN eliminated is output to the outside row by row.

First, at the beginning of the horizontal retrace interval, a selected row driving voltage $V_{ls}$ is turned ON. Thereafter, the original signal calibration pulse $\theta_{s2}$ is activated. As a result, the original signal switch transistor $SW_2$ shown in FIG. 3 is turned ON. Consequently, the original signal holding capacitor $C_1$, connected to the positive input terminal of the first subtractor 52, is provided with the output signal of the source follower in the form of charges from the pixel 10. The voltage value of the output signal is held as an original signal output voltage $V_{s0}$.

Subsequently, the reset pulse $\theta_R$ is activated. As a result, the pixel reset transistor 15 in each pixel 10 is turned ON and the power supply voltage $V_{DD}$ is applied to the photoelectric transducer/accumulator 12 as the reset voltage $V_{dx}$. Consequently, the pixel 10 can restore the potential, which has been generated in response to the incident light, into its initial state.

Next, the no signal output voltage calibration pulse $\theta_{s1}$ is activated. As a result, the no signal output voltage switch transistor $SW_1$ shown in FIG. 3 is turned ON. Consequently, the first no signal output voltage holding capacitor $C_2$, connected to the negative input terminal of the first subtractor 52, is provided with a signal in an initial state from the pixel 10, which is held as a no signal output voltage $V_r$. Also, a corrected original signal output voltage $V_{s1}$, which has been output from the first subtractor 52 and obtained by subtracting the no signal output voltage $V_r$ from the original signal output voltage $V_{s0}$, is held in the corrected original signal holding capacitor $C_3$. Furthermore, the second no signal output voltage holding capacitor $C_5$, connected to the negative input terminal of the second subtractor 53, is provided with a signal in a reset state from the pixel 10, which is held as the no signal output voltage $V_r$.

Next, the potential of the reset voltage $V_{dx}$ is reduced from the power supply voltage $V_{dd}$ to a calibration voltage $V_{dc}$ and the reset pulse $\theta_R$ is activated. If the reference signal calibration pulse $\theta_{s3}$ is activated while the reset pulse $\theta_R$ is activate, then the reference signal switch transistor $SW_3$ shown in FIG. 3 is turned ON. Consequently, the reference signal voltage holding capacitor $C_4$, connected to the positive input terminal of the second subtractor 53, is provided with the output voltage of the pixel 10, which is held as a reference signal output voltage $V_{c0}$. Also, a corrected reference signal output voltage $V_{c1}$, which has been output from the second subtractor 53 and obtained by subtracting the no signal output voltage $V_r$ from the reference signal output voltage $V_{c0}$, is held in the corrected reference signal holding capacitor $C_6$. Furthermore, the divider 54 divides the corrected original signal output voltage $V_{s1}$ held in the corrected original signal holding capacitor $C_3$ by the corrected reference signal output voltage $V_{c1}$ held in the corrected reference signal holding capacitor $C_6$. The corrected signal output voltage $V_{s2}$, which is the result of the division, is output from the divider 54.

Herein, the calibration voltage $V_{dc}$ is used for producing signal charges to be accumulated in the photoelectric transducer/accumulator 12 in each pixel 10 in the case where light having a constant quantity has been uniformly incident onto the imaging area 11. As described above, in the respective pixels 10, the reference signal output voltages $V_{c0}$ are different from each other because of the variation in capacitance of the photoelectric transducer/accumulators 12. Thus, if the corrected original signal output voltage $V_{s1}$ is divided by the corrected reference signal output voltage $V_{c1}$, then the above-described Equation (5) or (6) has been solved.

Next, in the horizontal output interval shown in FIG. 4, the control voltages of the column select shift register 40 shown in FIG. 2 are sequentially activated. As a result, the corrected signal output voltage $V_{s2}$ produced by each calibration circuit 51 is output through the impedance transformer 70 to the outside.

It is noted that immediately after the original signal output voltage $V_{s0}$ has been read out by activating the original signal calibration pulse $\theta_{s2}$, the reference signal output voltage $V_{c0}$ may be read out and then the no signal output voltage $V_r$ may be read out by resetting.

Also, depending upon the configuration of the pixel 10, after the no signal output voltage $V_r$ has been read out by resetting, the original signal output voltage $V_{s0}$ may be read out.

In this embodiment, the calibration circuit 51 formed between the imaging area 11 and the selected column driving section 60 eliminates the FPN sensitivity components from the corrected original signal output voltage $V_{s1}$ by using the corrected reference signal output voltage $V_{c1}$. Thus, this embodiment is effectively applicable to images of improved definition.

In this embodiment, the FPN offset components are eliminated beforehand by subtracting the no signal output voltage $V_r$, which is a voltage while no light is incident, from the original signal output voltage $V_{s0}$, and the reference signal output voltage $V_{c0}$. For example, if the FPN offset components are substantially negligible, this embodiment may be modified so as to eliminate the FPN sensitivity components only. More specifically, in such a case, the original signal output voltage $V_{s0}$ is input from the original signal switch transistor $SW_2$ to the dividend input terminal of the divider 54 and the reference signal output voltage $V_{c0}$ is input from the reference signal switch transistor $SW_3$ to the divisor input terminal of the divider 54.

In this embodiment, the photoelectric transducer/accumulator 12 of each pixel 10 functions both as a photoelectric transducer for converting light into signal charges and a signal charge accumulator for accumulating the signal charges transduced by the photoelectric transducer. Alternatively, the photoelectric transducer/accumulator 12 may be divided into a photoelectric transducer and a signal charge accumulator.

Also, the photoelectric transducer/accumulator may have a so-called "floating diffusion type" configuration in which a signal charge accumulator and a signal charge sensor are separately provided.

Moreover, in this embodiment, an amplifying solid-state imaging device for sensing light quantity distribution has been described as an exemplary physical quantity distribution sensing semiconductor device. However, the physical quantity distribution sensing semiconductor device of the present invention is not limited thereto. The present invention is naturally applicable to physical quantity distribution sensing semiconductor devices for sensing physical quantities other than light by providing a sensor for sensing physical quantities such as X-rays, infrared rays, temperature, magnetic field and pressure and by transmitting a potential, which is variable in accordance with the physical quantity received, to the gate of the driving transistor 13.

What is claimed is:

1. An amplifying solid-state imaging device comprising:
    an imaging area in which a plurality of unit pixels are arranged, each said unit pixel including photoelectric transducing means for sensing externally incident light and transducing the sensed incident light into signal charges having a charge quantity corresponding to the incident light, and signal charge accumulating means for accumulating the signal charges transduced by the photoelectric transducing means;
    a signal reading section for sequentially selecting a unit pixel from the unit pixels one by one and reading out using an amplifying device the signal charges accumulated in the selected unit pixel as an electric signal; and
    a plurality of calibration sections formed between outputs of the imaging area and inputs of the signal reading section so as to correspond to the respective unit pixels in the imaging area,
    each said calibration section including:
    original signal storing means for storing an original electric signal obtained by converting the signal charges accumulated in one of the unit pixels associated with the calibration section;
    reference signal storing means for storing a reference electric signal, which is output from the associated unit pixel upon the application of a predetermined reference electric signal to the associated unit pixel; and
    division means for dividing the original electric signal stored in the original signal storing means by the reference electric signal stored in the reference signal storing means and outputting the division result as an electric signal to the signal reading section;
    wherein the original signal storing means includes: an original signal holding capacitor; and an original signal switch transistor having a drain connected to the outputs of the imaging area, a source connected to one electrode of the original signal holding capacitor, and a gate receiving an original-signal-calibrating signal,
    and wherein the reference signal storing means includes: a reference signal holding capacitor; and a reference signal switch transistor having a drain connected to the outputs of the imaging area, a source connected to one electrode of the reference signal holding capacitor, and a gate receiving a reference-signal-calibrating signal,
    and wherein the division means includes a divider having a dividend input terminal connected to a common connection between the original signal switch transistor and the original signal holding capacitor, a divisor input terminal connected to a common connection between the reference signal switch transistor and the reference signal holding capacitor, and an output terminal connected to the inputs of the signal reading section.

2. The amplifying solid-state imaging device of claim 1, wherein each said calibration section further includes:
    an original signal offset component eliminator connected to the original signal storing means; and
    a reference signal offset component eliminator connected to the reference signal storing means;
    and wherein the original signal offset component eliminator includes:
    a first no signal output holding capacitor;
    a no signal output switch transistor having a drain connected to the outputs of the imaging area, a source connected to one electrode of the first no signal output holding capacitor and a gate receiving a no signal output calibrating signal;
    a first subtractor having a positive input terminal connected to a common connection between the original signal switch transistor and the original signal holding capacitor, and a negative input terminal connected to a common connection between the no signal output switch transistor and the first no signal output holding capacitor; and
    a corrected original signal holding capacitor connected in parallel between the first subtractor and the dividend input terminal of the divider,
    and wherein the reference signal offset component eliminator includes:
    the no signal output switch transistor;
    a second no signal output holding capacitor having one electrode connected to the source of the no signal output switch transistor;
    a second subtractor having a positive input terminal connected to a common connection between the reference signal switch transistor and the reference signal holding capacitor, and a negative input terminal connected to a common connection between the no signal output switch transistor and the second no signal output holding capacitor; and
    a corrected reference signal holding capacitor connected in parallel between the second subtractor and the divisor input terminal of the divider.

3. A physical quantity distribution sensing semiconductor device comprising:
    a physical quantity distribution sensing area in which a plurality of unit sensing sections are arranged, each said unit sensing section including physical quantity sensing and transducing means for sensing externally input physical quantity and transducing the sensed physical quantity into signal charges having a charge quantity corresponding to the physical quantity, and signal charge accumulating means for accumulating the signal charges transduced by the physical quantity sensing and transducing means;
    a signal reading section for sequentially selecting a unit sensing section from the unit sensing sections one by one and reading out using an amplifying device the signal charges accumulated in the selected unit sensing section as an electric signal; and
    a plurality of calibration sections formed between outputs of the physical quantity distribution sensing area and inputs of the signal reading section so as to correspond to the respective unit sensing sections in the physical quantity distribution sensing area,
    each said calibration section including:
    original signal storing means for storing an original electric signal obtained by converting the signal charges accumulated in one of the unit sensing sections associated with the calibration section;

reference signal storing means for storing a reference electric signal, which is output from the associated unit sensing section upon the application of a predetermined reference electric signal to the associated unit sensing section; and division means for dividing the original electric signal stored in the original signal storing means by the reference electric signal stored in the reference signal storing means and outputting the division result as an electric signal to the signal reading section, wherein the original signal storing means includes: an original signal holding capacitor; and an original signal switch transistor having a drain connected to the outputs of the physical quantity distribution sensing area, a source connected to one electrode of the original signal holding capacitor, and a gate receiving an original-signal-calibrating signal, and wherein the reference signal storing means includes: a reference signal holding capacitor; and a reference signal switch transistor having a drain connected to the outputs of the physical quantity distribution sensing area, a source connected to one electrode of the reference signal holding capacitor, and a gate receiving a reference-signal-calibrating signal, and wherein the division means includes a divider having a dividend input terminal connected to a common connection between the original signal switch transistor and the original signal holding capacitor, a divisor input terminal connected to a common connection between the reference signal switch transistor and the reference signal holding capacitor, and an output terminal connected to the inputs of the signal reading section.

4. An amplifying solid-state imaging device comprising:

a plurality of photoelectric transducing means, each sensing externally incident light and transducing the sensed incident light into signal charges having a charge quantity corresponding to the incident light;

a plurality of amplifying means, each amplifying the signal charges transduced by an associated one of the photoelectric transducing means and each outputting an amplifying signal;

reset means for outputting an offset signal from each of the amplifying means by externally applying a predetermined first voltage to an input of the amplifying means in order to reset the signal charges, which are obtained from each of the plurality of photoelectric transducing means;

reference signal generating means for outputting a reference signal from the plurality of amplifying means by externally applying a predetermined second voltage to the input of the amplifying means, the predetermined second voltage being different from the predetermined first voltage, the reference signal being equivalent to an electric signal obtained by transducing a predetermined light incident upon the photoelectric transducing means; and calibration means for generating a corrected signal from the original signal, the offset signal and the reference signal respectively and outputting the corrected signal, the original signal, the offset signal and the reference signal being output from each of the plurality of amplifying means, wherein the calibration means has division means for dividing corrected original signal by a corrected reference signal, and outputting the division result as the corrected signal, the corrected original signal being obtained by subtracting the offset signal from the original signal, and the corrected reference sign being obtained by subtracting the offset signal from the reference signal.

5. An amplifying solid-state imaging device comprising:

an imaging area in which a plurality of unit pixels are arranged, each unit pixel including photoelectric transducing means for sensing externally incident light and transducing the sensed incident light into signal charges having a charge quantity corresponding to the incident light, and signal charge accumulating means for accumulating the signal charges transduced by the photoelectric transducing means;

a plurality of amplifying means, each amplifying the signal charges transduced by an associated one of the photoelectric transducing means and each outputting an amplifying signal;

reset means for outputting an offset signal from each of the amplifying means by externally applying a predetermined first voltage to an input of the amplifying means in order to reset the signal charges, which arm obtained from each of the plurality of photoelectric transducing means;

reference signal generating means for outputting a reference signal from the plurality of amplifying means by externally applying a predetermined second voltage to the input of the amplifying means, the predetermined second voltage being different from the predetermined first voltage, the reference signal being equivalent to an electric signal obtained by transducing a predetermined light incident upon the photoelectric transducing means; and calibration means for generating a corrected signal from the original signal, the offset signal and the reference signal respectively and outputting the corrected signal, the original signal, the offset signal and the reference signal being output from each of the plurality of amplifying means, wherein the calibration means has division means for dividing a corrected original signal by a corrected reference signal and outputting the division result as the corrected signal, the corrected original signal being obtained by subtracting the offset signal from the original signal and the corrected reference signal being obtained by subtracting the offset signal from the reference signal.

6. A method for driving an amplifying solid-state imaging device, the amplifying solid-state imaging device including:

a plurality of photoelectric transducing means, each sensing externally incident light and transducing the sensed incident light into signal charges having a charge quantity corresponding to the incident light, a plurality of amplifying means, each amplifying the signal charges transduced by an associated one of the photoelectric transducing means and each outputting an amplifying signal;

reset means for outputting an offset signal from each of the amplifying means by externally applying a predetermined first voltage to an input of the amplifying means in order to reset the signal charges, which are obtained from each of the plurality of photoelectric transducing means;

reference signal generating means for outputting a reference signal from the plurality of amplifying means by externally applying a predetermined second voltage to the input of the amplifying means, the predetermined second voltage being different from the predetermined first voltage, the reference signal being equivalent to an electric signal obtained by transducing a predetermined light incident upon the photoelectric transducing means; and calibration means for generating a corrected signal from the original signal, the offset signal and the reference signal respectively and outputting the corrected signal, the original signal, the offset signal and the reference signal being output from each of the plurality of amplifying means, the method comprising the steps of:

inputting the original signal, the offset signal and the reference signal from each of the plurality of amplifying means to the calibration means;

dividing a corrected original signal by a corrected reference signal, the corrected original signal being obtained by subtracting the offset signal from the original signal and the corrected reference signal being obtained by subtracting the offset signal from the reference signal; and outputting the division result to the calibration means as the corrected signal.

7. A method for driving an amplifying solid-state imaging device, the amplifying solid-state imaging device including:

an imaging area in which a plurality of unit pixels are arranged, each unit pixel including photoelectric transducing means for sensing externally incident light and transducing the sensed incident light into signal charges having a charge quantity corresponding to the incident light, and signal charge accumulating means for accumulating the signal charges transduced by the photoelectric transducing means;

a plurality of amplifying means, each amplifying the signal charges transduced by an associated one of the photoelectric transducing means and each outputting an amplifying signal;

reset means for outputting an offset signal from each of the amplify means by externally applying a predetermined first voltage to an input of the amplifying means in order to reset the signal charges, which are obtained from each of the plurality of photoelectric transducing means;

reference signal generating means for outputting a reference signal from the plurality of amplifying means by externally applying a predetermined second voltage to the input of the amplifying means, the predetermined second voltage being different from the predetermined first voltage, the reference signal being equivalent to an electric signal obtained by transducing a predetermined light incident upon the photoelectric transducing means; and calibration means for generating a corrected signal from the original signal, the offset signal and the reference signal respectively and outputting the corrected signal, the original signal, the offset signal and the reference signal being output from each of the plurality of amplifying means, the method comprising the steps of:

inputting the original signal, the offset signal and the reference signal from each of the plurality of amplifying means to the calibration means;

dividing a corrected original signal by a corrected reference signal, the corrected original signal being obtained by subtracting the offset signal from the original signal, and the corrected reference signal being obtained by subtracting the offset signal from the reference signal, and outputting the division result to the calibration means as the corrected signal.

8. A physical quantity distribution sensing semiconductor device comprising:

a physical quantity distribution sensing area in which a plurality of unit sensing sections are arranged, each unit sensing section including physical quantity sensing and transducing means for sensing externally input physical quantity and transducing the sensed physical quantity into signal charges having a charge quantity corresponding to the physical quantity, and signal charge accumulating means for accumulating the signal charges transduced by the physical quantity sensing and transducing means;

a plurality of amplifying means, each amplifying the signal charges transduced by an associated one of the physical quantity sensing and transducing means and each outputting an amplifying signal;

reset means for outputting an offset signal from each of the amplifying means by externally applying a predetermined first voltage to an input of the amplifying means in order to reset the signal charges, which are obtained from each of the plurality of physical quantity sensing and transducing means;

reference signal generating means for outputting a reference signal from the plurality of amplifying means by externally applying a predetermined second voltage to the input of the amplifying means, the predetermined second voltage being different from the predetermined first voltage, the reference signal being equivalent to an electric signal obtained by transducing a predetermined physical quantity which is input to the physical quantity sensing and transducing means; and calibration means for generating a corrected signal from the original signal, the offset signal and the reference signal respectively and outputting the corrected signal, the original signal, the offset signal and the reference signal being output from each of the plurality of amplifying means, wherein the calibration means has division means for dividing a corrected original signal by a corrected reference signal and outputting the division result as the corrected signal, the corrected original signal being obtained by subtracting the offset signal from the original signal and the corrected reference signal being obtained by subtracting the offset signal from the reference signal.

9. The amplifying solid-state imaging device of claim 4, wherein the calibration means fiber includes:

original signal storing means for storing an original electric signal obtained by converting the signal charges accumulated in one of the unit pixels associated with the calibration section;

reference signal storing means for storing a reference electric signal, which is output from the associated unit pixel upon the application of a predetermined reference electric signal to the associated unit pixel; and division means for dividing the original electric signal stored in the original signal storing means by the reference electric signal stored in the reference signal storing means and outputting the division result as an electric signal to the signal reading section.

10. The amplifying solid-state imaging device of claim 5, wherein the calibration means further includes:

original signal storing means for storing an original electric signal obtained by converting the signal charges accumulated in one of the unit pixels associated with the calibration section;

reference signal storing means for storing a reference electric signal, which is output from the associated unit pixel upon the application of a predetermined reference electric signal to the associated unit pixel; and division means for dividing the original electric signal stored in the original signal storing means by the reference electric signal stored in the reference signal storing means and outputting the division result as an electric signal to the signal reading section.

11. An amplifying solid-state imaging device comprising:

a plurality of photoelectric transducing means, each sensing externally incident light and transducing the sensed incident light into signal charges having a charge quantity corresponding to the incident light;

a plurality of amplifying means, each amplifying the signal charges transduced by an associated one of the photoelectric transducing means and each outputting an amplifying signal; and calibration means for generating a compensation coefficient for correcting a signal from the amplifying means, wherein two different voltages are applied to an input of the amplifying means, and the calibration means generates the compensation coefficient by using an output of the amplifying means corresponding to the two different voltages.

12. A physical quantity distribution sensing semiconductor device comprising:

a plurality of unit sensing sections, each sensing an externally input physical quantity and transducing the sensed physical quantity into signal charges having a charge quantity corresponding to the physical quantity;

a plurality of amplifying means, each amplifying the signal charges transduced by an associated one of the unit sensing sections and each outputting an amplifying signal; and calibration means for generating a compensation coefficient for correcting a signal from the amplifying means, wherein two different voltages are applied to an input of the amplifying means, and the calibration means generates the compensation coefficient by using an output of the amplifying means corresponding to the two different voltages.

13. The amplifying solid-state imaging device of claim 4, wherein the predetermined first voltage and the predetermined second voltage are applied to the input of the amplifying means for every blanking interval.

14. The amplifying solid-state imaging device of claim 5, wherein the predetermined first voltage and the predetermined second voltage are applied to the input of the amplifying means for every blanking interval.

15. The method for driving an amplifying solid-state imaging device of claim 6, wherein the predetermined first voltage and the predetermined second voltage are applied to the input of the amplifying means for every blanking interval.

16. The method for driving an amplifying solid-state imaging device of claim 7, wherein the predetermined first voltage and the predetermined second voltage are applied to the input of the amplifying means for every blanking interval.

* * * * *